(12) United States Patent
Bartholomew

(10) Patent No.: US 6,234,544 B1
(45) Date of Patent: May 22, 2001

(54) QUICK CONNECTOR WITH CONFIRMATION FEATURE

(75) Inventor: Donald D. Bartholomew, Mt. Clemens, MI (US)

(73) Assignee: Proprietary Technology, Inc., Bloomfield Hills, MI (US)

( * ) Notice: Subject to any disclaimer, the term of this patent is extended or adjusted under 35 U.S.C. 154(b) by 0 days.

(21) Appl. No.: 09/043,706

(22) PCT Filed: Sep. 26, 1995

(86) PCT No.: PCT/US95/12282

§ 371 Date: Mar. 25, 1998

§ 102(e) Date: Mar. 25, 1998

(87) PCT Pub. No.: WO97/12170

PCT Pub. Date: Apr. 3, 1997

(51) Int. Cl.[7] .................................................. F16L 39/00
(52) U.S. Cl. ........................ 285/319; 285/321; 285/921
(58) Field of Search ..................................... 285/319, 321, 285/921

(56) References Cited

U.S. PATENT DOCUMENTS

| 3,341,227 | 9/1967 | Pierce, Jr. . | |
|---|---|---|---|
| 3,826,523 | * 7/1974 | Eschbaugh | 285/319 X |
| 4,266,814 | * 5/1981 | Gallagher | 285/319 |
| 4,681,351 | * 7/1987 | Bartholomew | 285/319 |
| 4,697,832 | * 10/1987 | Dickirson | 285/319 |
| 4,832,378 | 5/1989 | Zepp . | |
| 5,178,424 | 1/1993 | Klinger . | |
| 5,207,462 | * 5/1993 | Bartholomew | 285/321 |
| 5,297,818 | 3/1994 | Klinger . | |
| 5,350,203 | * 9/1994 | Mcnaughton et al. | 285/319 |
| 5,425,556 | 6/1995 | Szabo . | |
| 5,441,313 | 8/1995 | Kalahasthy . | |
| 5,520,151 | * 5/1996 | Gras et al. | 285/319 |

* cited by examiner

Primary Examiner—Teri Pham Luu
(74) Attorney, Agent, or Firm—Harness, Dickey & Pierce, PLC

(57) ABSTRACT

A quick connector-male conduit assembly (10) for use in a conduit coupling incorporates a hand-releasable, self-centering snap ring-like retainer (20) having a seating indicator (16) included therewith. The seating indicator (16) includes a pop-off ring (48) that goes around the male conduit (12), which is a part of the tubing leading to the connection to assist in the installation of the quick connector-male conduit assembly (10) into a female receptacle (11) and to positively indicate to the installer that the male conduit (12) has been properly locked to the female receptacle (11). The retainer (20) includes a pair of tabs (68) for easy manipulation by hand or tools for removal. The quick connector assembly (10) is on either a plastic or a metal male conduit (12), and can be as short as a threaded connection. The quick connector assembly (10) has no threads, and permits 360 degree rotation of the conduit (12).

85 Claims, 9 Drawing Sheets

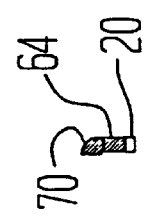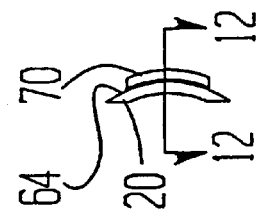
FIG 11
FIG 12
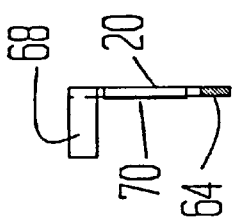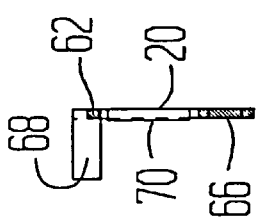
FIG 9
FIG 10
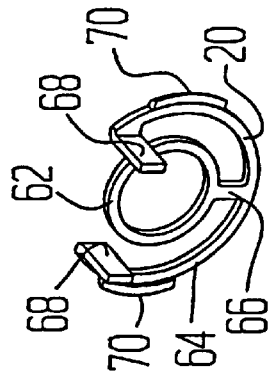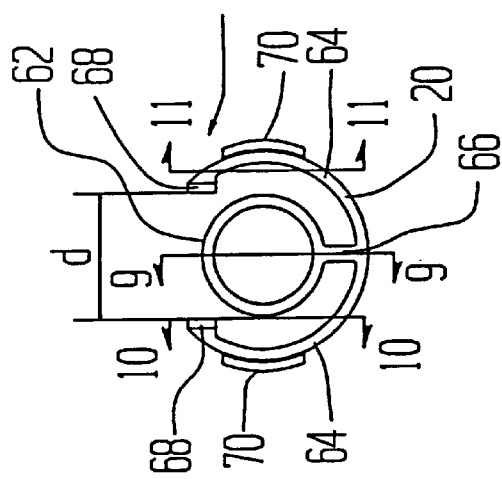
FIG 7
FIG 8

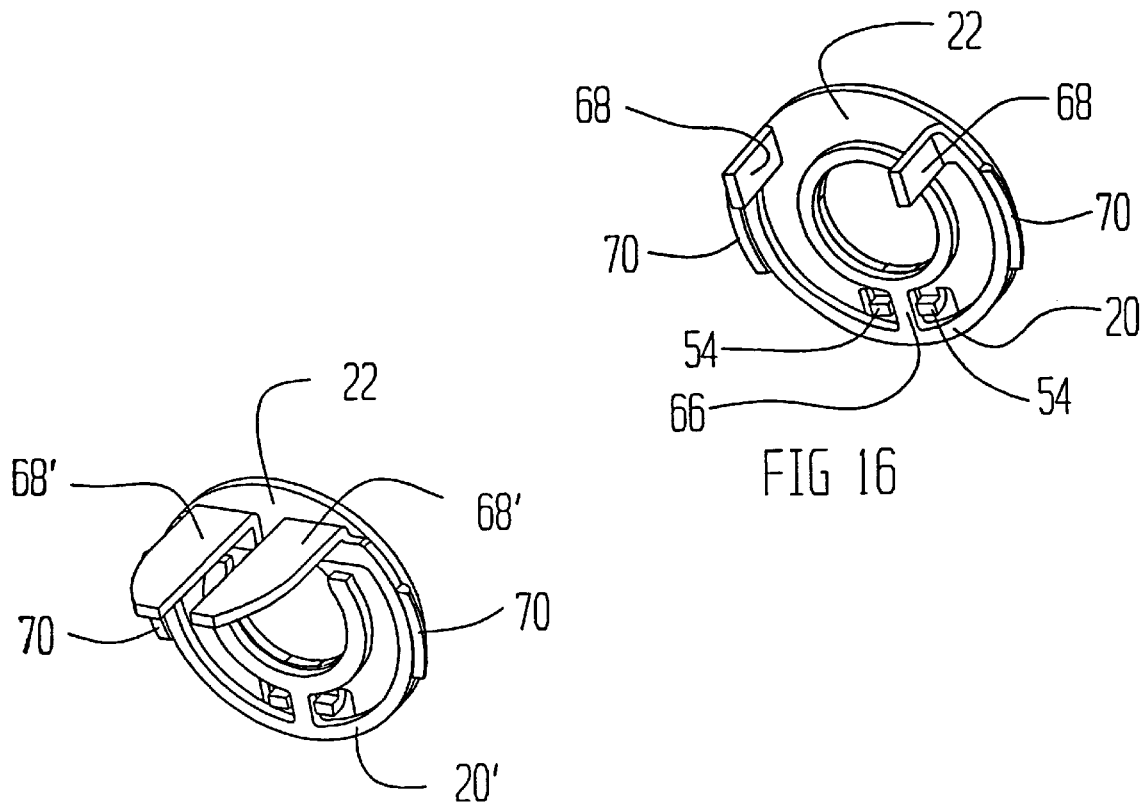
FIG 16
FIG 25
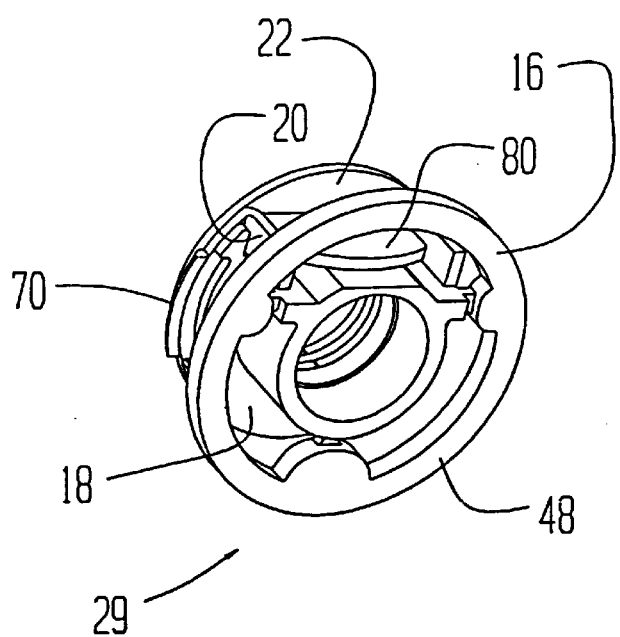
FIG 17

QUICK CONNECTOR WITH CONFIRMATION FEATURE

BACKGROUND OF THE INVENTION

This invention relates generally to a conduit coupling through which fluid flows. More particularly, the present invention relates to a quick connector which retains a male conduit within a female receptacle, and a connection of this type which includes a ring for confirming proper connection.

In the automotive industry (as well as for many other industries) the need always exists for low cost, reliable, and easy-to-assemble components, this need is especially apparent with respect to providing a connection between fluid conveying conduits, such as fuel, brake, or refrigerant lines. Traditionally, such a connection is comprised of a male conduit being retained within a female receptacle through use of threaded fittings, flare fittings, or through bolted-on flanges.

More recently, a variety of snap together quick connect retainers have been used in place of the conventional methods. These quick connectors typically have a plurality of flexible legs which engage an annular bead attached to a male conduit and also engage an undercut groove formed within a female member. Two such examples are disclosed in U.S. Pat. No. 4,601,497 entitled "Swivelable Quick Connector Assembly" which issued on Jul. 22, 1986, and U.S. Pat. No. 4,778,203 entitled "Swivelable Quick Connector for High Temperature Connection" which issued on Oct. 18, 1988, both of which were invented by the inventor of the present invention and are incorporated by reference herewithin. Another quick connector has a retainer which is flat with pairs of annular arms extending therearound which are radially flexible. Other quick connectors which were invented by the inventor of the present invention are disclosed in U.S. Pat. Nos. 4,524,995 and 4,423,892, both of which are entitled "Swivelable Quick Connector Assembly" and which issued on Jun. 25, 1985, and Jan. 23, 1984, respectively, and are incorporated by reference herewithin.

While the aforementioned quick connectors present significant improvements in the art, it is desirable to advance the improvements of the known art. Specifically, it is desirable to provide a coupling retainer which readily fits into the female receptacle and is easily removed therefrom. It is also desirable to provide a coupling retainer with a minimum number of parts and is shallow enough to be used instead of a screw-in type joint. In addition, it is desirable to provide such a coupling which clearly indicates that the quick connector-male conduit assembly is properly seated within the female receptacle.

SUMMARY OF THE PRESENT INVENTION

In accordance with the present invention, a preferred embodiment of the coupler includes an array of three, or with the indicator, four quick connector engagement components fitted to the end of a male conduit to form a quick connector-male conduit assembly in addition to the parts required for sealing. The array includes an intermediate plate, a retainer, a backing plate, and, as a forth component, a seating indicator. The intermediate plate includes a pair of alignment nibs that align the plate with the adjacent retainer, which itself includes a pair of release and alignment tabs for alignment with the backing plate for use when a metal tube or a plastic tube and tube liner are used. The backing plate also includes a tab which is used for aligning the backing plate with the seating indicator and the retainer. The array of these engagement components is substantially self-centering on the male conduit. Because of the series of alignment members, the engagement components also resist rotation with respect to each other.

The retainer includes a ring which fits about a portion of the male conduit and a pair of outer arms on which the release (and alignment to the intermediate plate and the seating indicator) tabs are formed. The ring and the outer arms lie substantially within a common plane. A locking lug is formed along the outer periphery of each of the outer arms for releasable engagement with a locking recessed bore formed along the inner circumference of the axial bore of the female receptacle. The outer arms are coaxial with the ring. The ring and the outer arms are attached to each other at a common area which allows the outer arms to be moved toward one another such as by squeezing, independent of the inner arms. A series of bushings and an O-ring (or O-rings) are provided adjacent the array of engagement components to provide for proper seal of the male conduit within the female receptacle, as well as providing for proper fit of these components with respect to each other, such that a bearing on the male portion to the female portion, on each side (inner and outer) of the sealing member is provided.

Insertion of the quick connector-male conduit assembly is effected by the installer generally positioning the free end of the male conduit into the female receptacle and (if a seating indicator is used) pushing against a pop-off ring until the ring franges from the body of the seating indicator. The franging action indicates that the quick connector-male conduit assembly is properly seated within the female receptacle. The outer arms of the retainer and their associated locking lugs are squeezed toward the inner arms as the retainer is forced past a concave outer surface formed on the female receptacle.

Removal of the assembly from the female receptacle is easily accomplished by the remover squeezing the release and alignment tabs toward one another either by use of a hand or a tool so as to force the outer arms toward the inner arms, thus allowing the locking lugs to clear the radial retainer-locking wall forming the locking recessed bore in the bore of the female receptacle. Once cleared, the remover withdraws the quick connector-male conduit assembly from the female receptacle. The quick connector male is an assembly that is placed directly on the conduit that carries the fluid.

The present invention overcomes some of the difficulties associated with assembly and disassembly of known connectors. Specifically, the retainer does not require assembly to a centering component other than the conduit. Furthermore, the springing interlocking part is like a snap-ring and is in the plane of the locking to the female portions, thus eliminating known springs that undesirably occupy some length parallel to the conduit and are at right angles to the plane of the radial retainer-locking wall of the locking recessed bore and the locking portions carried on the conduit by the springing component.

Accordingly, it is an object of the present invention to provide a hand-releasable quick connector that incorporates a relatively thin retainer.

It is a further object of the present invention to provide a connection that can employ both metal and plastic for the male and female portions.

It is yet still another object of the present invention to provide several variations male and female components of the connection.

It is a further object of the present invention to provide such a retainer that is relatively inexpensive to manufacture.

A further object of the present invention is to provide a swivelable quick connector which can be used to replace, in the same space, a flare or screw-in connector.

Still another object of the present invention is to provide a self-centering snap ring-type of retainer that may be released by hand.

A further object of the present invention is to provide a quick connector which can be a part of the conduit between connections.

Still another object of the present invention is to provide a quick connector which has a pop-off ring to show when a connection is properly made.

Additional advantages and features of the present invention will become apparent from the following description and appended claims, taken in conjunction with the accompanying drawings.

BRIEF DESCRIPTION OF THE DRAWINGS

The above-noted advantages as well as other advantages of the present invention will become apparent to one skilled in the art by reading the following specification and subjoined claims in conjunction with reference to the following drawings in which:

FIG. 7 is a perspective view of the retainer of the assembly according to a preferred embodiment of the present invention;

FIG. 8 is an end view of the retainer of FIG. 7;

FIG. 9 is a sectional view of the retainer according to a preferred embodiment taken along lines 9—9 of FIG. 8;

FIG. 10 is a sectional view taken along lines 10—10 of FIG. 8

FIG. 11 is a sectional view taken along lines 11—11 of FIG. 8;

FIG. 12 is a sectional view taken along lines 12—12 of FIG. 11;

FIG. 16 is a perspective view of the intermediate plate and the retainer ring according to a preferred embodiment of the present invention;

FIG. 17 is a perspective view of the array of seating indicator, backing plate, retainer, and intermediate plate components according to a preferred embodiment of the present invention;

FIG. 25 is a perspective view of an alternate embodiment of the retainer fitted to the intermediate plate according to a preferred embodiment of the present invention.

DETAILED DESCRIPTIONS OF THE PREFERRED EMBODIMENTS

In general, the present invention is directed to a quick connector-male conduit assembly incorporating a hand-releasable, self-centering ring-like retainer having a seating indicator assembled therewith. The seating indicator includes a pop-off ring to assist in the installation of the quick connector-male conduit assembly into a female receptacle and to positively indicate to the installer that a male conduit has been locked to a female receptacle. The present invention finds utility in, for example, coupling the tubing disposed between the elements of fuel, water, or oil systems. It may be used with plastic or metal conduits, as shown in the inventor's pending U.S. patent application Ser. No. 08/503,454, titled MEANS OF COUPLING NON-THREADED CONNECTIONS.

More particularly, the connector of the present invention also finds application in external oil lines and hoses as well as in hydraulic brake systems. The present connector may also be used in vehicle fuel systems, between, for example, the fuel tank and the fuel pump and the carburetor or fuel injection system. While having particular usefulness in motor vehicles, the connector of the present invention may also find application in virtually any situation in which male and female fluid-carrying lines must be connected.

Figure 1:
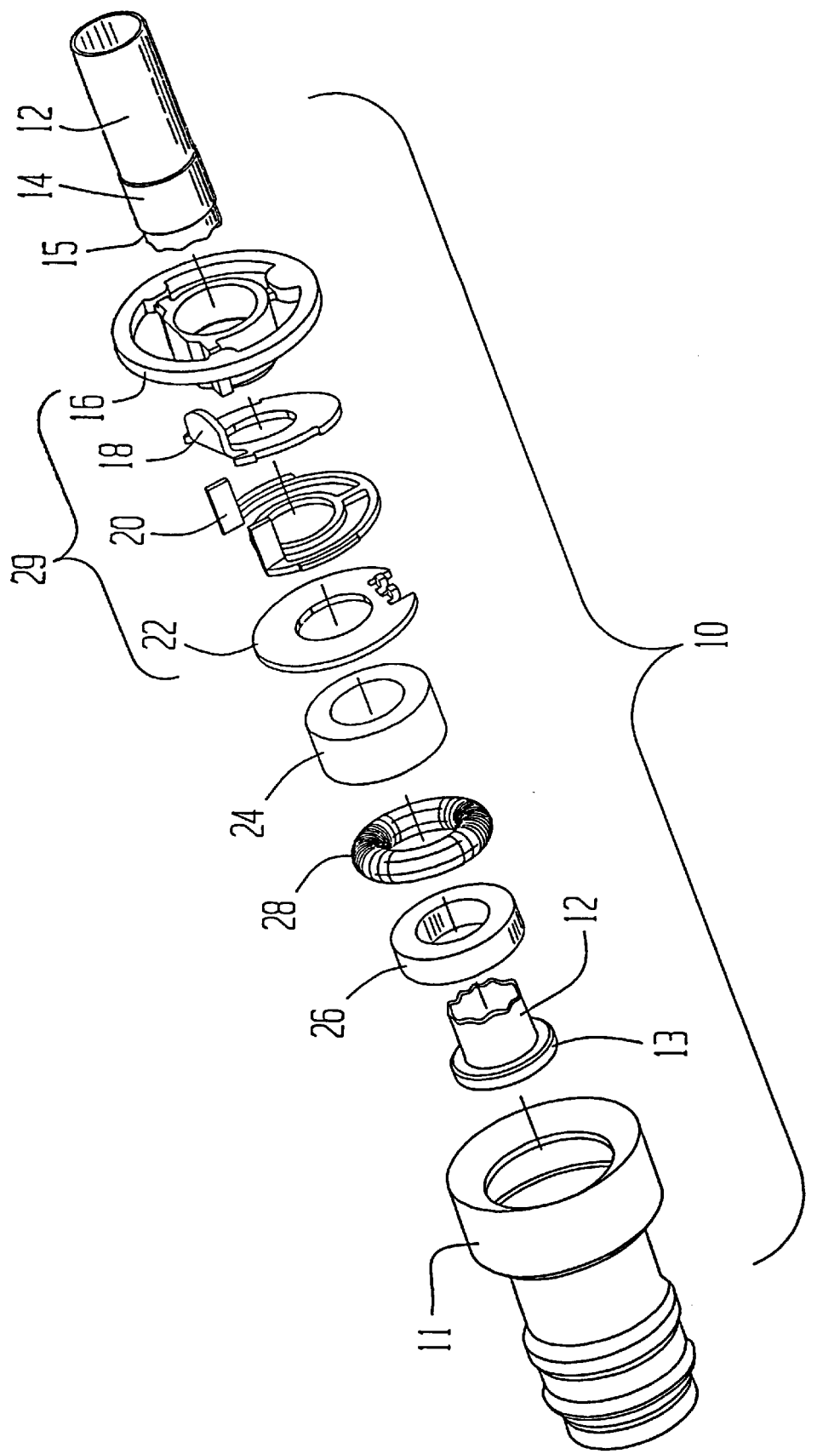
FIG. 1 shows an exploded view of the quick connector according to a preferred embodiment of the present invention.

Referring to FIG. 1, an exploded view of a quick connector-male conduit assembly, collectively referred to as 10, and an exemplary female receptacle 11 is illustrated. The female receptacle 11 as illustrated is of the deep drawn type and may be made of a drawn metal or other material. The assembly 10 includes a male conduit 12 (shown broken). The male conduit 12 is an elongated cylindrically-shaped part having a distal portion or flanged end 13 and a raised collar 14 formed at a predetermined longitudinal distance from the flanged end 13. The raised collar 14 includes a radial wall 15. The assembly 10 acts as a fluid conduit for a fuel, braking or refrigeration system within an automotive vehicle or the like. Therefore, the male conduit 12 must be securely affixed within the female receptacle 11.

The assembly 10 also includes a seating indicator 16, a backing plate 18, a hand-releasable, self-centering retainer 20, an intermediate plate 22, a pair of bushings 24 and 26, and an O-ring 28. (It is to be understood that the O-ring 28 is provided for sealing and could consist of, for example, a pair of O-rings.) The seating indicator 16, the backing plate 18, the retainer 20, and the intermediate plate 22 collectively form an array of engagement components 29. The bushings 24 and 26. are annular shaped and are preferably defined by quadrilateral walls having rectangular cross sectional shapes. However, as is known to one skilled in the art, such bushings may be U-shaped. The bushings 24 and 26 are useful in "piloting" the assembly 10 into the female receptacle 11. The bushings 24 and 26 are made from a plastic material or a metallic material having sufficient hoop strength to withstand the radially outward-directed forces acting thereupon, or they can be slip-fitted along the conduit from plastic or metal. The O-ring 28 is preferably formed from an elastomeric material such as rubber.

The bushing 26 and the O-ring 28 are both sealing and supporting members, and their configuration and even their numbers could be altered as necessary to provide for proper fluid-tight assembly of the male and female components. The engagement components of the array 29, the bushings 24 and 26, and the O-ring 28 are captured between the flanged end 13 and the radial wall 15 of the raised collar 14. An exterior side of the bushing 24 engages the plate 22 thereby transferring the forces that would otherwise separate the male conduit 12 from the female receptacle 11. The plate 22 acts to receive these separation forces on the male conduit 12 from the bushing 24 and transfer the forces to the female receptacle 11 by interlocking with a radial retainer-locking wall forming one wall of a recessed bore formed in the female receptacle 11, as will be described below. The wall 15 keeps the engagement component array 29 from translating away from the connection.

Figure 2:
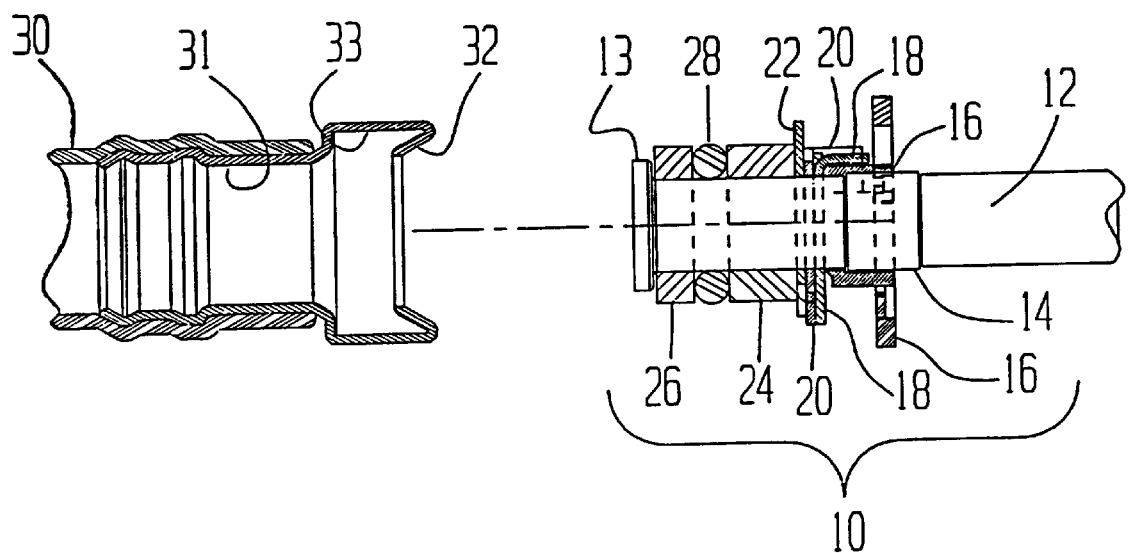
FIG. 2 is a sectional view of the quick connector-male conduit elements of FIG. 1 assembled and spaced apart from a female receptacle, also shown in section.

FIG. 2 is a modified view of the exploded view shown in FIG. 1 showing the components of the quick connector-male conduit assembly 10 assembled on the end of the male conduit 12. The general configuration of the male conduit 12 and its overall design are some of the subjects of the inventor's pending U.S. patent application, Ser. No. 08/503,454, titled MEANS OF COUPLING NON-THREADED CONNECTIONS. As is known in the art, part of the end of the female receptacle 11 is fitted within the end of a hose or line 30 which is preferably made from a semi-flexible and expandable elastomeric material such as rubber, however, expandable polymeric and metallic materials can also be used.

FIG. 2 also illustrates the construction of the female receptacle 11 which is an exemplary but not an exclusive receptacle for use with the quick connector-male conduit assembly 10 of the present invention. The female receptacle includes a throughbore 31 that includes lead-in chamfer 32 formed at the open end of the throughbore 31 of the female receptacle 11. The chamfer 32 aids in the installation of the retainer 20. The retainer 20 is a quick connect fastener that includes outer flexible arms (discussed below with respect to FIGS. 7 through 12) that are compressibly squeezed inward toward the longitudinal axis of the male conduit 12 by insertion into the lead-in chamfer 32 of the female receptacle 11.

The throughbore 31 of the female receptacle 11 also includes a locking recessed bore 33 adjacent the lead-in chamfer 32. The retainer 20 is releasably locked within the recessed bore 33. The semi-flexible hose or tube 30 is attached to the female receptacle 11.

Figure 3:
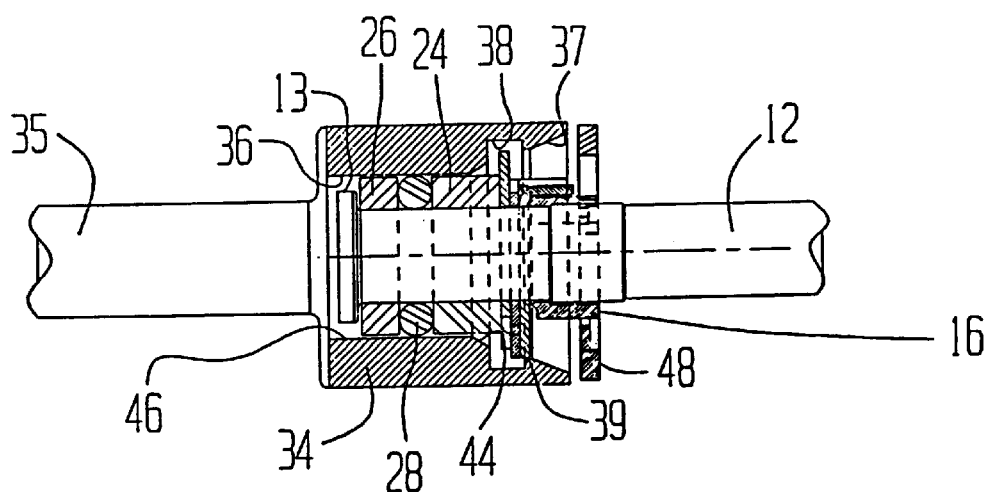
FIG. 3 is a sectional view of a quick connector-male conduit assembly like FIGS. 1 and 2 locked in position within an alternate embodiment of a female receptacle.

Referring to FIG. 3, a sectional view of the assembly 10 locked within a female receptacle 34 formed at the end of a rigid fluid line 35 is illustrated. The receptacle 34 includes a throughbore 36 having a lead-in chamfer 37, a recessed bore 38, a radial retainer-locking wall 39, an inner conical surface 44, and an inner tubular bore 46. (The interior configuration of the female receptacle 34 is more clearly seen in the cross-sectional illustration of this element shown and discussed below with respect to FIG. 23.) As with the lead-in chamfer 32 discussed above with respect to FIG. 2, the lead-in chamfer 37 compressibly squeezes the compressible elements of the retainer 20 to thereby allow it to pass into the recessed bore 38 and to lock against the radial retainer-locking wall 39. The inner conical surface 44 pilots the bushing 26 (together with the O-ring 28 and the bushing 24) into the inner tubular bore 46.

The seating indicator 16 includes a pop-off ring 48. According to the illustration of FIG. 3, a portion of the seating indicator 16 has been inserted into the female receptacle 34 by the operator pushing against the conduit 12. According to the illustrated view, the assembly 10 is locked into place, but the pop-off ring 48 has not yet been broken away. Pressing on the conduit 12 causes further pressure against the pop-off ring 48 applied by the female receptacle 34 end, than that applied to put the assembly 10 in the illustrated position, will cause it to break away from the rest of the seating indicator 16, thus indicating to the installer that the assembly 10 has been locked into place in the female receptacle 34 (or any other embodiment of the female conduit illustrated herein).

Figure 4:
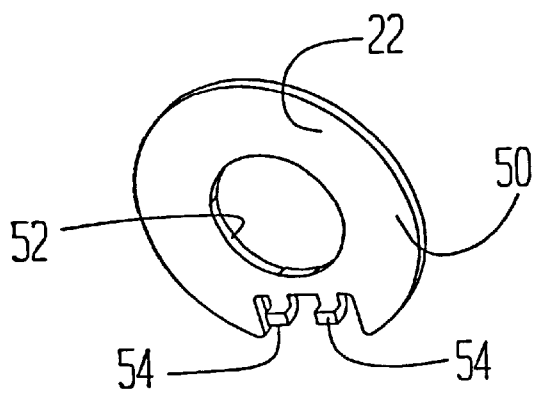
FIG. 4 is a perspective view of one side of the quick connector intermediate plate according to a preferred embodiment of the present invention.
Figure 5:
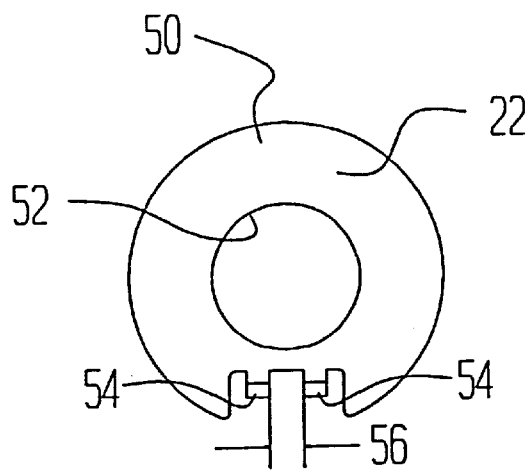
FIG. 5 is an end view of the quick connector intermediate plate shown in FIG. 4.
Figure 6:
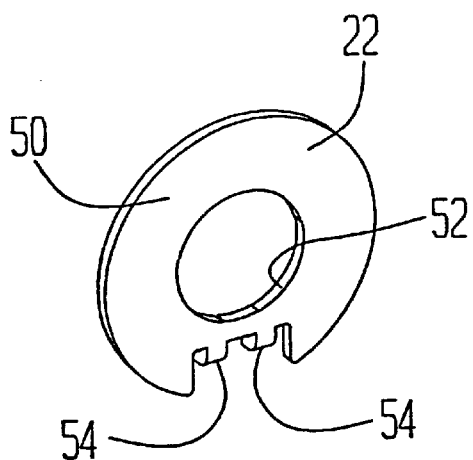
FIG. 6 is a perspective view of side opposite that side of the quick connector intermediate plate shown in FIG. 4.

FIGS. 4 through 6 illustrate various views of the plate 22. The plate 22 is formed from a rigid material, such as a metal or a hard plastic. The plate 22 includes a flat, disc-shaped body 50 having a central, male conduit-passing aperture 52 formed therein. At one side of the body 50 are formed a pair of spaced-apart alignment nibs 54 which extend outward away from the plane of the body 50. The nibs 54 have a space 56 formed therebetween, the purpose of which will be described below with respect to several of the following figures.

FIGS. 7 through 12 illustrate various whole and sectional views of the hand-releasable, self-centering retainer 20 of the present invention. The retainer 20 includes a ring 62 that is formed for disposition about a portion of the male conduit 12 (not shown). The ring 62 extends more than 180 degrees about the male conduit 12 so that the retainer 20 remains assembled thereto. It is recognized that the ring 62 can also be truncated at the top to make more room for release tabs, discussed below. The retainer further includes a pair of outer arms 64 which are concentric with the ring 62 and are connected to the ring 62 by means of a common joining area 66. The outer arms 64 are deflectable independent of the ring 62. The ring 62 and the outer arms 64 are planar. Furthermore, the ring 62 and the arms 64 are planar with the radial retainer-locking wall 39 of the exemplary female receptacle 34 shown in FIG. 3 (and with similar radial retainer-locking walls of other female receptacles).

The cantilevered ends of each of the outer arms 64 each define a hand-release tab 68, shown perspectively in FIG. 7 and partially in the side views of FIGS. 9 and 10. Each of the outer arms 64 also includes a locking lug 70. The length of release tabs 68 is dependent on distance "d" between inside surfaces of tabs 68 which is, in turn, controlled by the outside diameter of arms 64. The tabs 68 are to close over the male conduit 12 (not shown) as the retainer 20 is released. The locking lugs 70 extend from the outside diameter of arms 64 by about 0.025 or 0.030 inches to engage an undercut diameter of the female receptacle (not shown). The undercut diameter is similar to a snap ring groove, but longer than a regular snap ring groove. The retainer 20 is stamped and formed from resilient steel or is formed from a plastic.

Referring particularly to FIG. 9, a section taken along lines 9—9 of FIG. 8 is shown. This section is cut through the common joining area 66 which joins the ring 62 (see FIG. 1) with the outer arms 64. The locking lug 70 is shown projecting from the outer arms 64 in FIG. 9, as are the release tabs 68 (shown in side view).

Referring to FIG. 10, a section taken along lines 10—10 of FIG. 8 is illustrated. The area of the illustrated section is cut through outer arm 64, joining area 66 and the ring 62.

Referring to FIG. 11, a section taken along lines 11—11 of FIG. 8 is illustrated.

Referring to FIG. 12, a section taken along lines 12—12 of FIG. 11 is illustrated. In order that the locking lug 70 not scrape or gall against the chamfer lead-in of the female member (not shown) during quick connect installation, the locking lug 70 is formed so as to present a smooth surface.

Figure 13:
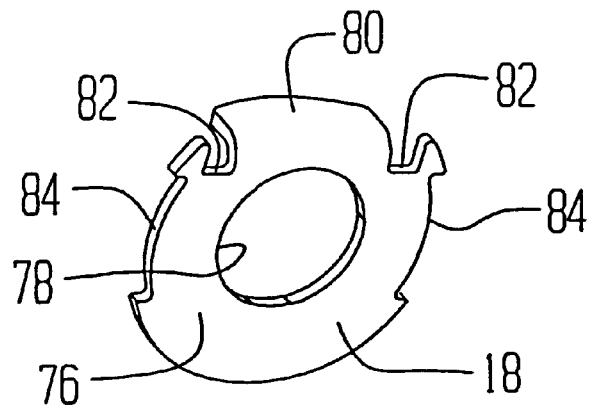
FIG. 13 is a perspective view of the backing plate according to a preferred embodiment of the assembly of the present invention.
Figure 15:
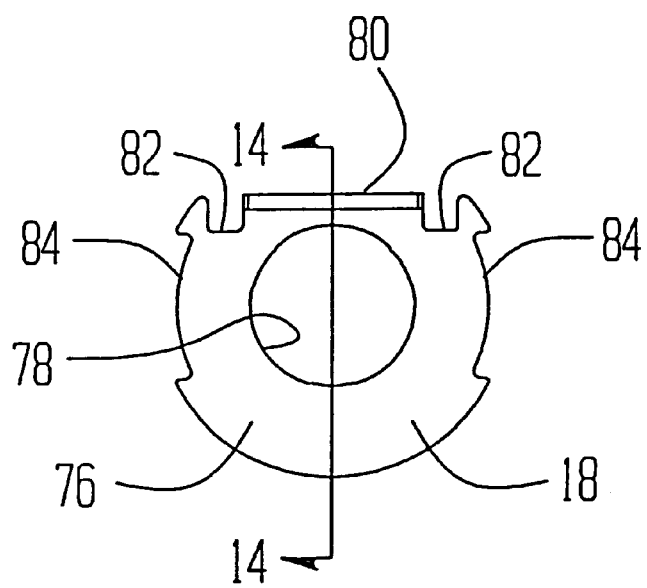
FIG. 15 is an end view of the backing plate of FIG. 13, taken from the side opposite that shown in FIG. 13.
Figure 14:
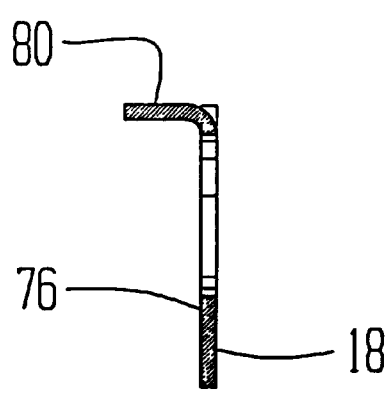
FIG. 14 is a side view of the backing plate of FIG. 13.

Referring to FIGS. 13 through 15, various views of the backing plate 18 are illustrated. Like the plate 22, the backing plate 18 is generally formed from a flat, disc-like plate of a rigid material such as a metal or a plastic. The plate 18 includes a body 76. A male conduit-passing aperture 78 is centrally formed in the body 76 of the plate 18. Unlike the plate 22, however, a tab 80 of the plate 18 is bent substantially perpendicularly with respect to the plane of the body 76. Adjacent the tab 80 are a pair of notches 82 which slottably receive the release tabs 68 of the retainer 20.

The tab 80 functions to align the plate 18 with the seating indicator 16 and the retainer 20, and to substantially prevent rotation of these three elements with respect to each other. The tab 80 also functions to prevent the spring portions of arms 64 (as illustrated in FIGS. 7, 8, and 9) from becoming over-stressed. A pair of recesses 84 are also formed in the sides of the body 76 of the plate 18 to receive the locking lugs 70 of the retainer 20.

FIG. 16 shows a portion of the array 29 with the intermediate plate nested against the retainer 20. As will be understood by referring to FIG. 16, the nibs 54 of the plate 22 are placeable on either side of the common joining area 66, thereby capturing the retainer 20 and preventing rotation of the plate 22 with respect to the retainer 20. (This is for purposes of having two diameters for 52 [the inner diameter], one diameter is for providing room for a plastic tube [shown in FIG. 23] to be expanded by a bulge 108 on the end of a liner 104 as the liner 104 is inserted into the end of the plastic conduit. These two diameters are also used on the backing plate for inner diameter 78 [illustrated in FIGS. 13–15].)

The nesting of the plate 22, the retainer 20, the plate 18, and the seating indicator 16 is clearly illustrated as the engagement component array 29 of FIG. 17, which is a perspective view showing these members positioned together. The centrally-formed series of like-sized apertures through the array 29 for receiving the cylindrical form of the male conduit 12 (not shown) is plainly visible.

Figure 19:
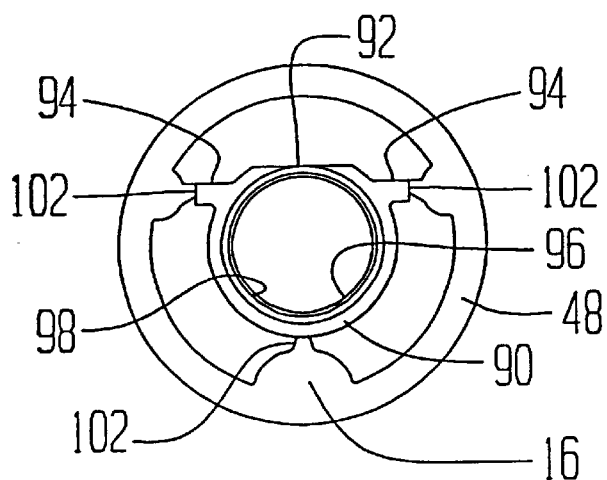
FIG. 19 is end view of the seating indicator of FIG. 18.
Figure 20:
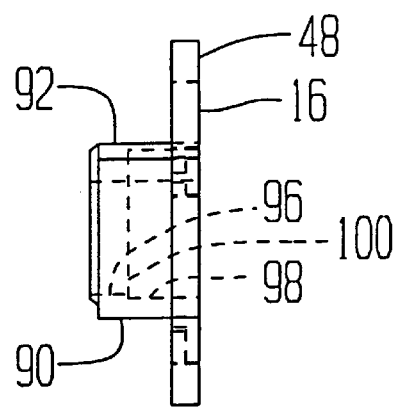
FIG. 20 is side view of the seating indicator of FIG. 18.
Figure 18:
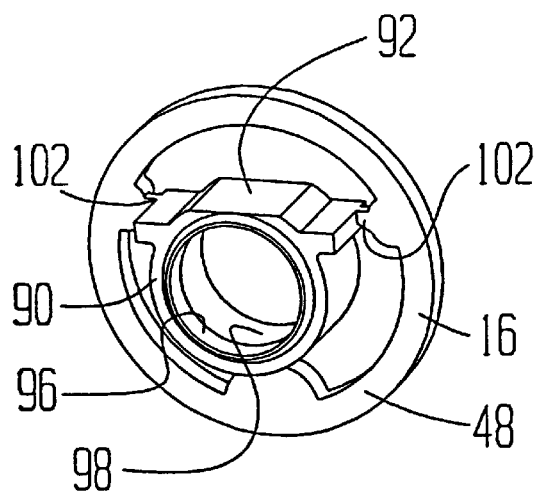
FIG. 18 is a perspective view of the seating indicator of FIG. 17.

FIGS. 18 through 20 illustrate various views of the seating indicator 16. The indicator 16 includes essentially three elements that are frangible from one another, and, accordingly, the indicator 16 is formed from a breakable material such as a rigid plastic, although a brittle metal may as well be used as required for certain high-temperature applications.

As noted above, the indicator 16 includes the pop-off ring 48. The ring 48 is frangibly attached by a series of to a semi-cylindrical body 90 having a section 92 that is thinner than the rest of the semi-cylindrical body 90. The section 92 is formed to accommodate the tab 80 of the plate 18. The section 92 abuts a pair of adjacent flat surfaces 94. A cylindrical, male conduit-passing bore 96 is centrally formed through the semi-cylindrical body 90. Within the bore 96 is a restricted bore surface 98 formed therein. The restricted bore surface 98 (best seen in broken lines in FIG. 20) forms a shoulder 100 (also best seen in broken lines in FIG. 20) with the bore 96. The shoulder 100 provides a stop against downstream axial movement the male conduit 12 by a bulge formed on the male conduit 12 (or conduit 103 shown in FIG. 23). This may be understood by, for example, reference to FIGS. 21 and 22. This general concept is more fully discussed in the above-mentioned pending application.

A series of frangible bridges 102 connect the ring 48 to the semi-cylindrical body 90. It is these bridges 102 that are broken by the over-travel permitted by the length of the snap ring-type groove in the female and after proper connection between the quick connector-male conduit assembly 10 is fitted within a female receptacle. As will be seen, the bridges 102 are formed from relatively thin stock and are, accordingly, relatively weak connecting points which will frange before either the ring 48 or the semi-cylindrical body 90. Once broken away, the pop-off ring 48 is free of the body 90 and may be either snipped by the installer and removed from the conduit 12 or may be left on the conduit 12. Because the pop-off ring 48 is in the shape of the ring and fully encircles the conduit 12, it is unlikely that the presence of the ring 48 will interfere with the operation of the vehicle even if the ring 48 were to travel down the conduit 12.

Figure 21:
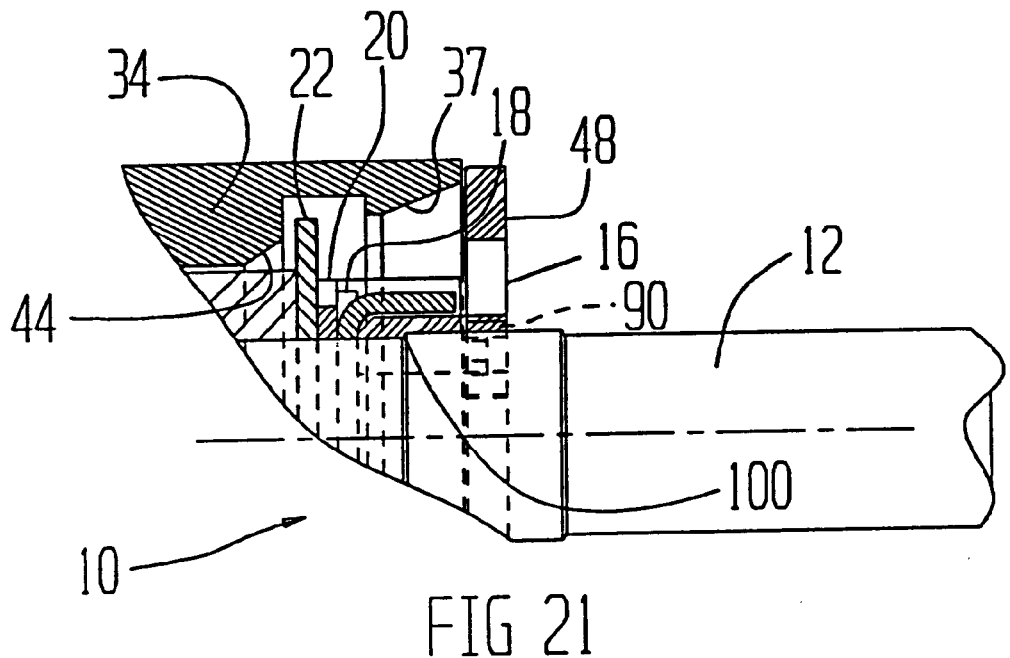
FIG. 21 is a partial, detailed sectional view of the quick connector-male conduit assembly having been locked into place with the pop-off ring of the seating indicator in its franged position.
Figure 22:
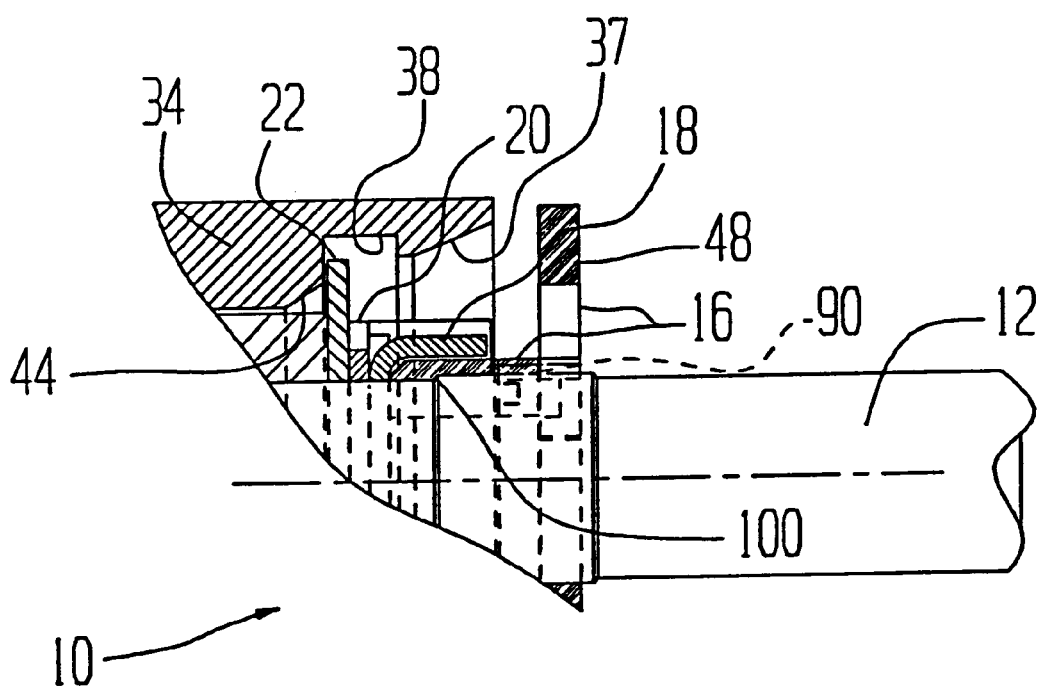
FIG. 22 is a view similar to the view of FIG. 21 but illustrating the ring element in spaced apart relation from the female receptacle.

FIGS. 21 and 22 illustrate a portion of the mated quick connector-male conduit assembly 10 within the female receptacle 34. In FIG. 21, the quick connector-male conduit assembly 10 is illustrated as having been locked into place in the female receptacle 34. In FIG. 22 the pop-off ring 48 has been pushed off by the installer pushing on conduit 12 beyond the locked-in position until the plate 22 stops at the inside vertical wall of the recessed bore 38, where this wall meets the start of the surface 44. The pop-off ring is, accordingly, shown broken away or franged from the body 90 (shown in broken lines in FIG. 22). As noted above, after being broken away by the end of the lead-in chamfer 37 from the semi-cylindrical body 90, the pop-off ring 48 is free to travel away from the body 90. FIG. 22 illustrates how the pop-off ring 48 may be moved away from the body 90 and, hence, the female receptacle 34 after proper connection of the quick connector-male conduit assembly 10 into the female receptacle has been completed.

Figure 23:
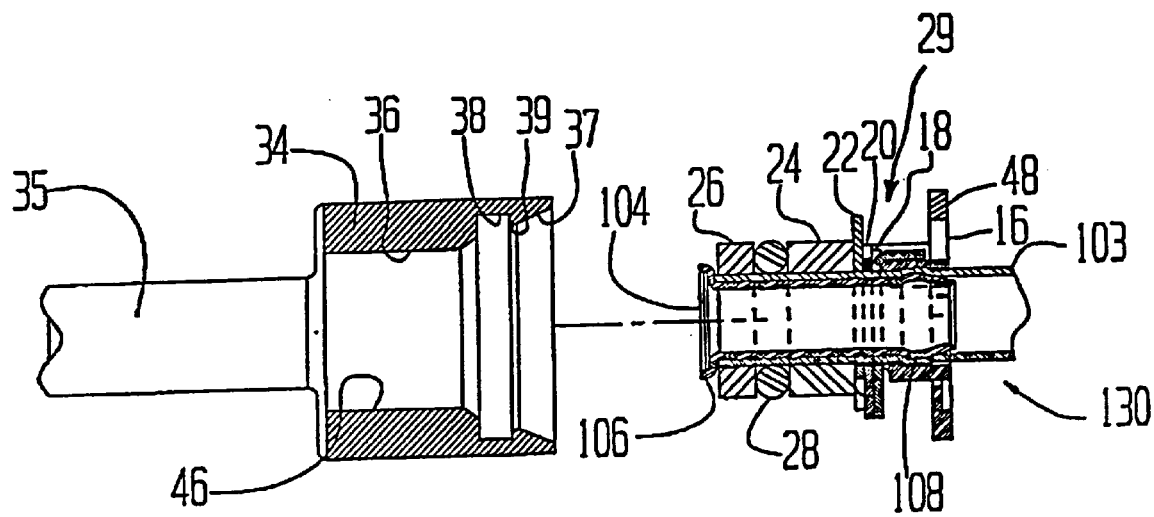
FIG. 23 is a sectional view illustrating an alternate embodiment of the quick connector-male conduit assembly of the present in spaced apart relation from the female receptacle of FIG. 3.

FIG. 23 illustrates the female receptacle 34 of FIG. 3 and the engagement components of the array 29 as previously discussed. However, the construction of the male conduit, generally illustrated as assembly 130, is different from the male conduit 12 discussed above. The conduit assembly 130, which is one aspect of the invention of the inventor's above-mentioned pending U.S. patent application Ser. No. 08/503,454, includes a conduit 103 and a tubular sleeve 104. The conduit 103 may be composed either of a substantially elastic material such as a rubber or other polymerized material, while the tubular sleeve 104 is formed from a rigid metal or plastic. The tubular sleeve 104 includes a flange 106 that acts to retain the bushing 26, the O-ring 28, the bushing 24, and the engagement array 29 on the conduit 103. A bulge 108 is formed on the sleeve 104. The bulge 108 limits axial longitudinal translation of the components of the quick connector along the conduit 103. In FIG. 23, the inner bushing 26 may be replaced by forming the sleeve 104 to have a flange 106 that includes bushing 26.

Figure 24:
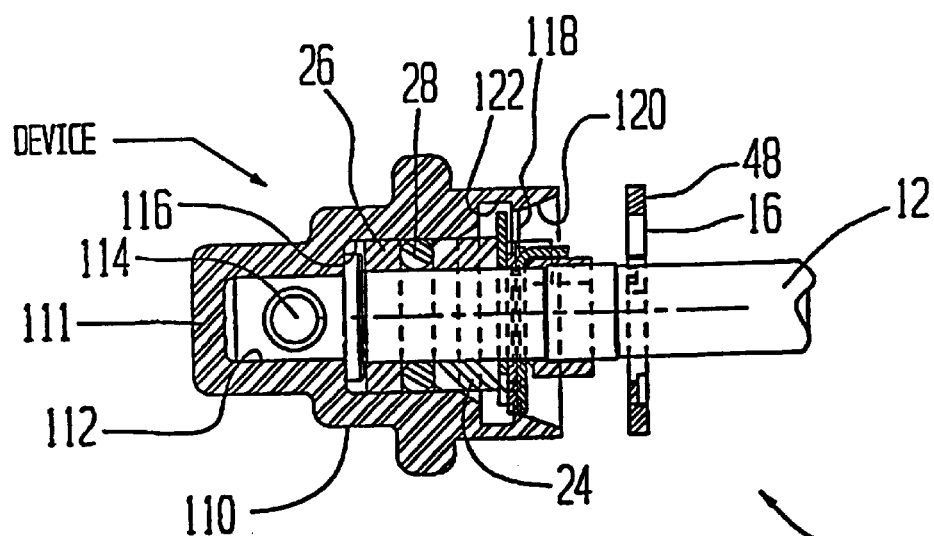
FIG. 24 is a sectional view of an embodiment of the quick connector-male conduit assembly of FIG. 24 locked in place within still a further alternate embodiment of the female receptacle according to the present invention.

FIG. 24 is a sectional view illustrating the quick connector-male conduit assembly 10 shown in certain ones of the several figures and discussed above locked into a female receptacle 110 which is a machined part of a device 111 such as a brake housing or a carburetor. The female receptacle 110 includes a blind bore 112 having a substantially perpendicular, fluid-passing passageway 114 formed therein. The blind bore 112 further includes a bushing and O-ring-receiving bore 116, a bore 118 and a snap ring-like groove 122 formed in the bore 118 for lockably receiving the quick connector-male conduit assembly 10, and a lead-in chamfer 120. The pop-off ring 48 has been separated in the figure. This arrangement is similar to that shown and discussed above in FIGS. 3 and 23 with respect to the female receptacle 34. Of course, the configuration of the device 111 may significantly vary from that configuration shown, and, accordingly, the device 111 should be taken only as exemplary and not limiting, as are the configurations of each of the female receptacles shown and discussed above with respect to the various configurations of the present invention.

FIG. 25 illustrates a perspective view of an alternate embodiment of a hand-releasable, self-centering retainer, illustrated as 20', fitted to the plate 22. A pair of hand-release tabs 68' are provided in lieu of the hand-release tabs 68 of the retainer 20 illustrated above in FIG. 16 and discussed with respect thereto. The hand-release tabs 68' are preferably but not exclusively formed at 90 degree angles relative to the release tabs 68. By doing this, the plate 18 no longer requires the ear 80 (illustrated in FIG. 17), and is planar instead. The gap between the hand-release tabs 68' serves the same purpose as the ear 80 on the plate 18. The release tabs 68' project through the seating indicator 16.

Regardless of the particular embodiment, the connectors of the present invention disclose several advantages over the prior art including a simple method of installing and removing a quick connector-male conduit assembly into and from a female receptacle and for readily verifying that the assembly is properly and fixedly attached.

Although the figures contain the indicator 16, it is recognized that the indicator 16 is not necessary to provide a fluid-tight connection. If the indicator 16 is not used, it is only necessary that the expanded area of the conduit be moved slightly toward the end of the conduit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A retainer assembly for a fluid-confining connector for retaining a male conduit to a female receptacle, the female receptacle having lead-in chamfer and a recessed inner wall, said assembly comprising:

a retainer composed of a resilient material, said retainer including an engaging lug extending radially therefrom for engagement with the recessed inner wall of the female receptacle;

said retainer being mounted on the male portion whereby the male conduit plugs into and locks within the female receptacle;

said retainer including a central ring of at least 180 degrees about the axis of the male conduit to assure that said retainer enters the lead-in chamber of the female receptacle, said retainer further including an outer arm, said central ring serving to hold said retainer on the male conduit, said outer arm being distortable toward the male conduit;

at least two tabs connected to said outer arm for the purpose of moving said outer arm toward the male conduit; said engaging lug being connected to said outer arm and being disengageable from the female receptacle by operation of said tabs, wherein said retainer operates at substantially right angles to the male conduit where said central ring is connected to said outer arm; and means for confirming connection of the male conduit within the female receptacle.

2. The retainer assembly of claim 1, wherein said at least two tabs are formed along a first plane and said ring is formed along a second plane, said first plane being substantially perpendicular to said second plane.

3. The retainer assembly of claim 2, wherein said first plane is a common plane.

4. The retainer assembly of claim 1, wherein the lead-in chamfer of the female receptacle compressible squeezes said outer arm toward the male conduit sufficiently to allow said engaging lug to pass through the port of the female receptacle.

5. The retainer assembly of claim 1, wherein said retainer is formed from strip metal.

6. The retainer assembly of claim 1, wherein said retainer is formed from wire.

7. The retainer assembly of claim 1, wherein said retainer is formed from a plastic.

8. The retainer assembly of claim 1, wherein said means for confirming includes a body and a ring, said ring being operable to separate from said body for confirming that the connection has taken place.

9. The retainer assembly of claim 8, further including means surrounding and gripping the male conduit such that travel of said device along the male conduit is restricted.

10. The retainer of claim 1, wherein said retainer further includes parts for passing force to said retainer.

11. The retainer of claim 10, wherein travel away from said male conduit end is prevented by a section of said male conduit.

12. The retainer assembly of claim 1, wherein the lead-in portion of the female receptacle has a small diameter having a width and wherein said retainer has a diameter that is greater than the small diameter width of the lead-in portion and when said outer arm is in its relaxed position with respect to said inner arm, said outer arm being operable to move toward said distorted position as a portion of the male conduit is fitted within the female receptacle for engagement therewith.

13. A retainer assembly for retaining a male conduit to a female receptacle, the female receptacle having lead-in chamfer and a recessed inner wall, said retainer assembly comprising:

a retainer, said retainer including a body mounted on said male conduit;

a central ring of at least 180 degrees about the axis of the male conduit and an outer arm mounted on said body, said central ring being connected to said outer arm and being operable to mount said body to said male conduit, said outer arm being resiliently movable between a relaxed position to a distorted position wherein said outer arm is moved toward said central ring;

a tab fitted to said outer arm for selectively moving said arm toward said central ring;

an engaging lug operable to engage the recessed inner wall of the female receptacle, said engaging lug extending radially from said outer arm and being movable to one of an inner wall-disengaging position and an inner wall-engaging position by selective movement of said tab; said retainer providing mounting on said male conduit that will permit said retainer to enter the lead-in chamfer formed in the female receptacle; and means for confirming connection of the male conduit within the female receptacle.

14. The retainer assembly of claim 13, wherein the lead-in portion has a small diameter and the small diameter has a width and wherein said retainer has a diameter that is greater than the small diameter of the lead-in portion when said outer arm is in its relaxed position with respect to said central ring, said outer arm being operable toward said distorted position as a portion of said male conduit is fitted into said female receptacle for engagement therewith.

15. The retainer assembly of claim 13, wherein the male conduit includes a long axis and wherein said body is positioned at substantially a right angle to the long axis of the male conduit.

16. The retainer assembly of claim 13, wherein said retainer is formed from a resilient material.

17. The retainer assembly of claim 16, wherein said resilient material is strip metal.

18. The retainer assembly of claim 16, wherein said resilient material is wire.

19. The retainer assembly of claim 13, wherein said means for confirming includes a body and a ring, said ring being operable to separate from said body for confirming connection of the male conduit to the female receptacle.

20. The retainer assembly of claim 19, wherein said retainer assembly further includes means for resisting translation of said confirming device along the male conduit.

21. The retainer assembly of claim 13, wherein said retainer further includes sides for the purpose of passing force to said retainer.

22. The retainer assembly of claim 21, wherein travel away from said male conduit end is prevented by a section of said male conduit.

23. A connector assembly for use in communicating a fluid media, said assembly comprising:

a female receptacle having a throughbore and a male conduit-receiving end continuous with said throughbore, said throughbore including a recessed inner wall;

a male conduit having an end for insertion into said male conduit-receiving end of said female conduit;

a retainer positioned on said end of said male conduit, said retainer including a central ring and means for retaining said retainer within said recessed inner wall of said female conduit, said means for retaining including a pair of tabs for selectively releasing said retainer from said recessed inner wall; and a confirming device including a body and a ring, said ring being operable to separate from said body when pressure is applied to it by said female receptacle, for confirming connection of said male conduit within said female receptacle.

24. The connector assembly of claim 23, wherein said central ring defines at least 180 degrees about the central axis of the male conduit.

25. The connector assembly of claim 24, wherein said tabs extend beyond said male conduit-receiving end of said female receptacle when said male conduit is locked into said female receptacle.

26. The connector assembly of claim 24, wherein said tabs remain within said male conduit-receiving end of said female receptacle when said male conduit is locked into said female receptacle.

27. The connector assembly of claim 24, wherein said tabs are flush with said male conduit-receiving end of said female receptacle when said male conduit is locked into said female receptacle.

28. The connector assembly of claim 24, wherein said means for retaining comprises a pair of arms resiliently connected to said central ring and being deformable between a recessed inner wall engaging position and a recessed inner wall disengaging position.

29. The connector assembly of claim 24, further including an aligning ring positionable between said retainer and said confirming device for substantially preventing rotation of said aligning ring, said retainer and said confirming device with respect to each other.

30. The connector assembly of claim 29, further including a wall engaging lug formed on each of said pair of arms, said aligning ring having recessed areas for receiving each lug of each arm.

31. The connector assembly of claim 30, wherein said aligning ring includes an aligning tab and wherein said confirming device includes a thin section for accommodating said aligning tab.

32. The connector assembly of claim 24, wherein said retainer further includes areas operatively associated with said retainer for passing force to said retainer.

33. The connector assembly of claim 24, wherein travel away from said male conduit end is prevented by a section of said male conduit.

34. A connector assembly for use in communicating a fluid media, said assembly comprising:

a female receptacle having a throughbore and a male conduit-receiving end continuous with said throughbore;

a male conduit having an end and at least a portion of which is insertable into said male conduit-receiving end of said female receptacle;

means for retaining said end of said male conduit within said female receptacle, said means for retaining including a pair of substantially coplanar tabs for selectively releasing said means for retaining from the assembly; and a confirming device including a body and a ring, said ring being operable to separate from said body for confirming connection of said male conduit within said sale receptacle.

35. The connector assembly of claim 34, further including at least two frangible bridges formed between said body and said ring of said confirming device.

36. The connector assembly of claim 35, wherein said confirming device is movable between a non-confirming position wherein said frangible bridges are intact to a confirming position wherein said frangible bridges are broken.

37. The connector assembly of claim 34, wherein said body includes a throughbore that is positionable over anually movable along said end of said male conduit.

38. The connector assembly of claim 34, wherein sax body is a drum-shaped, elongated member.

39. The connector assembly of claim 34, wherein said body includes a pushing surface against which an installer applies pressure to force said male conduit into said female receptacle until said means for retaining reaches a point of engagement to engage said male conduit within said female receptacle.

40. The connector assembly of claim 34, wherein said confirming device includes at least two frangible bridges connecting said ring and said body, said frangible bridges being broken at said point of engagement to confirm to the installer that engagement of said male conduit within said female receptacle has been correctly made.

41. The connector assembly of claim 34, wherein said throughbore includes a recessed inner wall and said means for retaining comprises a retainer positioned on said end of said male conduit.

42. The connector assembly of claim 41, wherein said retainer includes a central ring, a Fair of outer arms connected to said ring and deflectable independent of said ring, and means for engaging said retainer within said recessed inner wall of said female conduit.

43. The connector assembly of claim 42, wherein a pair of tabs are connected to said pair of outer arms for selectively releasing said retainer from said recessed inner wall.

44. The connector assembly of claim 43, wherein said tabs extend beyond said male conduit-receiving end of said female receptacle when said male conduit is locked into said female receptacle.

45. The connector assembly of claim 43, wherein said tabs remain within said male conduit-receiving end of said female receptacle when said male conduit is locked into said female receptacle.

46. The connector assembly of claim 43, wherein said tabs are flush with said male conduit-receiving end of said female receptacle when said male conduit is locked into said female receptacle.

47. The connector assembly of claim 43, wherein said means for engaging comprises a pair of arms resiliently connected to said central ring and being deformable between a recessed inner wall engaging position and a recessed inner wall disengaging position, said tabs being formed on said arms.

48. The connector assembly of claim 34, further including an aligning ring positionable between said retainer and said confirming device for substantially preventing rotation of said aligning ring, said retainer and said confirming device with respect to each other.

49. The connector assembly of claim 34 wherein said retainer further includes a ring for purposes of passing force to said retainer and means on said male conduit for preventing said ring from translating away from said male conduit end.

50. The connector assembly of claim 49, further including a wall engaging lug formed on each of said pair of arms, said aligning ring having recessed areas for receiving each lug of each arm.

51. The connector assembly of claim 50, wherein said confirming device includes a slot and wherein said aligning ring includes an aligning tab that is positionable with said slot of said confirming device.

52. A retainer for retaining a male conduit to a female receptacle, the female receptacle having a lead-in chamfer and a recessed inner wall, said retainer comprising:
a central ring of at least 180 degrees operably disposed about the male conduit to assure that said retainer enters the lead-in chamfer of the female receptacle, said central ring operable to hold said retainer on the male conduit;
a pair of arms concentric with said central ring, said arms and said central ring being formed in a first plane and said arms selectively resiliently moveable toward said central ring from a first position to a second position;
a pair of tabs cooperable with said pair of arms for selectively resiliently moving said pair of arms toward said central ring, wherein said pair of tabs are substantially coplanar and substantially perpendicular to said first plane; and
a locking lug operable to engage the recessed inner wall of the female receptacle, said locking lug having a portion formed on at least one of said pair of arms for movement toward and away from engagement with the female receptacle.

53. The retainer of claim 52, wherein said pair of tabs are formed in a first plane and said central ring is formed in a second plane substantially perpendicular to said first plane.

54. The retainer of claim 52, wherein said retainer is formed from a resilient material.

55. The retainer of claim 52, wherein said resilient material is strip metal.

56. The retainer of claim 52, wherein said resilient material is wire.

57. The retainer of claim 54, wherein said resilient material is plastic.

58. The retainer of claim 52, wherein said first position is a relaxed position and said second position is a distorted position.

59. The retained of claim 52, wherein said central ring and said pair of arms are connected at a common joining area.

60. The retainer of claim 52, wherein said central ring includes a truncated portion.

61. The retainer of claim 52, wherein said pair of arms are deflectable independent of said central ring.

62. A retainer assembly for a fluid-confining connector for retaining a male conduit to a female receptacle, the female receptacle having a lead-in chamfer and a recessed inner wall, said retainer assembly comprising:
an intermediate plate having a central aperture formed therein for receiving the male conduit and a pair of spaced-apart alignment nibs;
a retainer having a pair of tabs and a pair of locking lugs operable to engage the recessed inner wall of the female receptacle, said retainer adjacent to said intermediate plate and operable to engage said alignment nibs of said intermediate plate such that said alignment nibs align said intermediate plate with said retainer;
a backing plate having a central aperture formed therein for receiving the male conduit and a truncated end wherein said pair of tabs are operably aligned with said truncated end; and
a seating indicator positioned adjacent to said backing plate and having a central aperture formed therein for receiving the male conduit.

63. The retainer assembly of claim 62, wherein said retainer comprises:
a central ring of at least 180 degrees operably disposed about the male conduit to hold said retainer on the male conduit and to align said retainer with the lead-in chamfer of the female receptacle;
a pair of arms concentric with said central ring, said arms being selectively resiliently moveable toward said central ring from a first position to a second position;
said pair of tabs cooperable with said pair of arms for selectively resiliently moving said pair of arms toward said central ring, wherein said pair of tabs are substantially coplanar; and
said locking lugs having a portion formed on at least one of said pair of arms for movement toward and away from engagement with the female receptacle.

64. The retainer assembly of claim 63, Wherein said pair of tabs are formed in a first plane and said central ring is formed in a second plane substantially perpendicular to said first plane.

65. The retainer assembly of claim 63, wherein the male conduit includes a longitudinal axis and wherein said central ring is positioned substantially perpendicular to said longitudinal axis of the male conduit.

66. A. The retainer assembly of claim 63, Herein said retainer is formed from a resilient material.

67. The retainer assembly of claim 63, wherein the lead-in chamfer of the female receptacle causes said pair of arms to sufficiently distort toward the male conduit to allow said locking lug to pass through a port formed on the female receptacle.

68. The retainer assembly of claim 63, wherein said pair of tabs and said truncated end of said backing plate prevent said pair of arms from becoming over-stressed by preventing over deflection.

69. The retainer assembly of claim 63, wherein said central ring and said pair of arms are connected at a common joining area.

70. The retainer assembly of claim 63, wherein said central ring includes a truncated portion.

71. The retainer assembly of claim 63, wherein said pair of arms are deflectable independent of said central ring.

72. The retainer assembly of claim 63, wherein said pair of tabs extend beyond a male conduit-receiving end of the female receptacle when the male conduit is positioned into the female receptacle.

73. The retainer assembly of claim 63, wherein said pair of tabs align and prevent rotation of said retainer, said backing plate and said seating indicator as all are nested together.

74. A connector assembly for use in communicating a fluid media, said connector assembly comprising:

a female receptacle having a throughbore and a male conduit-receiving end continuous with said throughbore, said throughbore including a recessed inner wall;

a male conduit having a longitudinal axis and an end at least a portion of which is insertable into said male conduit-receiving end of said female receptacle;

a retainer having a pair of substantially coplanar tabs parallel to said longitudinal axis of said male conduit, said retainer being mounted on said male conduit and operable to engage said recessed inner wall of said female receptacle whereby said male conduit plugs into and locks within said female receptacle; and a seating indicator positioned adjacent to said retainer and having a central aperture formed therein for receiving said male conduit.

75. The connector assembly of claim 74, wherein said retainer further comprises:

a central ring of at least 180 degrees operably disposed about said male conduit to hold said retainer on said male conduit and to align said retainer with said throughbore of said female receptacle;

a pair of arms concentric with said central ring, said arms being selectively resiliently moveable toward said central ring from a first position to a second position;

said pair of tabs cooperable with said pair of arms for selectively resiliently moving said pair of arms toward said central ring; and a locking lug operable to engage said recessed inner wall of said female receptacle, said locking lug having a portion formed on at least one of said pair of arms and for movement toward and away from engagement with said female receptacle.

76. The connector assembly of claim 75, wherein said pair of tabs are formed in a first plane and said central ring is formed in a second plane substantially perpendicular to said first plane.

77. The connector assembly of claim 75, wherein said central ring is positioned substantially perpendicular to said longitudinal axis of said male conduit.

78. The connector assembly of claim 75, wherein said retainer is formed from a resilient material.

79. The connector assembly of claim 75, wherein said throughbore of said female receptacle causes said pair of arms to sufficiently distort toward said male conduit to allow said locking lug to pass through a port formed on said female receptacle.

80. The connector assembly of claim 75, further including a backing plate having a central aperture formed therein for receiving the male conduit and a truncated end wherein said pair of tabs and said truncated end of said backing plate prevent said pair of arms from becoming over-stressed by preventing over deflection.

81. The connector assembly of claim 80, wherein said pair of tabs align and prevent rotation of said retainer wherein said pair of tabs are operably aligned with said truncated end of said backing plate.

82. The connector assembly of claim 75, wherein said central ring and said pair of arms are connected at a common joining area.

83. The connector assembly of claim 75, wherein said central ring includes a truncated portion.

84. The connector assembly of claim 75, wherein said pair of arms are deflectable independent of said central ring.

85. The connector assembly of claim 75, wherein said pair of tabs extend beyond skid male conduit-receiving end of said female receptacle when said male conduit is positioned into said female receptacle.

* * * * *